United States Patent
Okamoto

(10) Patent No.: US 11,285,912 B2
(45) Date of Patent: Mar. 29, 2022

(54) VEHICLE BODY REAR STRUCTURE

(71) Applicant: HONDA MOTOR CO., LTD., Tokyo (JP)

(72) Inventor: Yoshinori Okamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 16/815,470

(22) Filed: Mar. 11, 2020

(65) Prior Publication Data

US 2020/0307506 A1    Oct. 1, 2020

(30) Foreign Application Priority Data

Mar. 28, 2019    (JP) .............................. JP2019-065057

(51) Int. Cl.
| | |
|---|---|
| *B60R 22/24* | (2006.01) |
| *B62D 25/06* | (2006.01) |
| *B60R 22/40* | (2006.01) |
| *B60J 5/10* | (2006.01) |
| *B62D 25/04* | (2006.01) |
| *B60R 22/34* | (2006.01) |

(52) U.S. Cl.
CPC ................. *B60R 22/24* (2013.01); *B60J 5/10* (2013.01); *B60R 22/34* (2013.01); *B60R 22/40* (2013.01); *B62D 25/04* (2013.01); *B62D 25/06* (2013.01)

(58) Field of Classification Search
CPC ......... B60R 22/40; B60R 22/24; B60R 22/34; B62D 25/06; B62D 25/04; B62D 25/08
USPC ........ 296/203.01, 203.04, 29, 30; 280/801.1, 280/808, 806
See application file for complete search history.

(56) References Cited

U.S. PATENT DOCUMENTS

| | | | | |
|---|---|---|---|---|
| 2005/0017497 | A1* | 1/2005 | Hirotani | B60R 22/023 280/807 |
| 2006/0001253 | A1* | 1/2006 | Lee | B60R 22/24 280/807 |
| 2009/0051155 | A1* | 2/2009 | Amano | B60R 22/24 280/801.2 |

FOREIGN PATENT DOCUMENTS

| | | | | |
|---|---|---|---|---|
| JP | 2000001156 A | * | 1/2000 | ........... B60R 22/023 |
| JP | 4534110 B2 | | 9/2010 | |

* cited by examiner

*Primary Examiner* — Dennis H Redder
(74) *Attorney, Agent, or Firm* — Rankin, Hill & Clark LLP

(57) ABSTRACT

Provided is a vehicle body rear structure including: a rear roof rail extending in a vehicle width direction and being attached with a retractor for a seat belt; a bracket which is connected to the rear roof rail, so that the retractor is arranged between the bracket and the rear roof rail, and defines an opening portion at an end portion in the vehicle width direction thereof with the rear roof rail; and an extension which connects an end portion in the vehicle width direction of at least one of a top surface and a rear surface of the bracket to a front wall of the rear roof rail. The rear roof rail includes a protruding portion which protrudes frontward to have the retractor arranged therein, and the front wall extending in a vertical direction at a front side of a vehicle body.

5 Claims, 6 Drawing Sheets

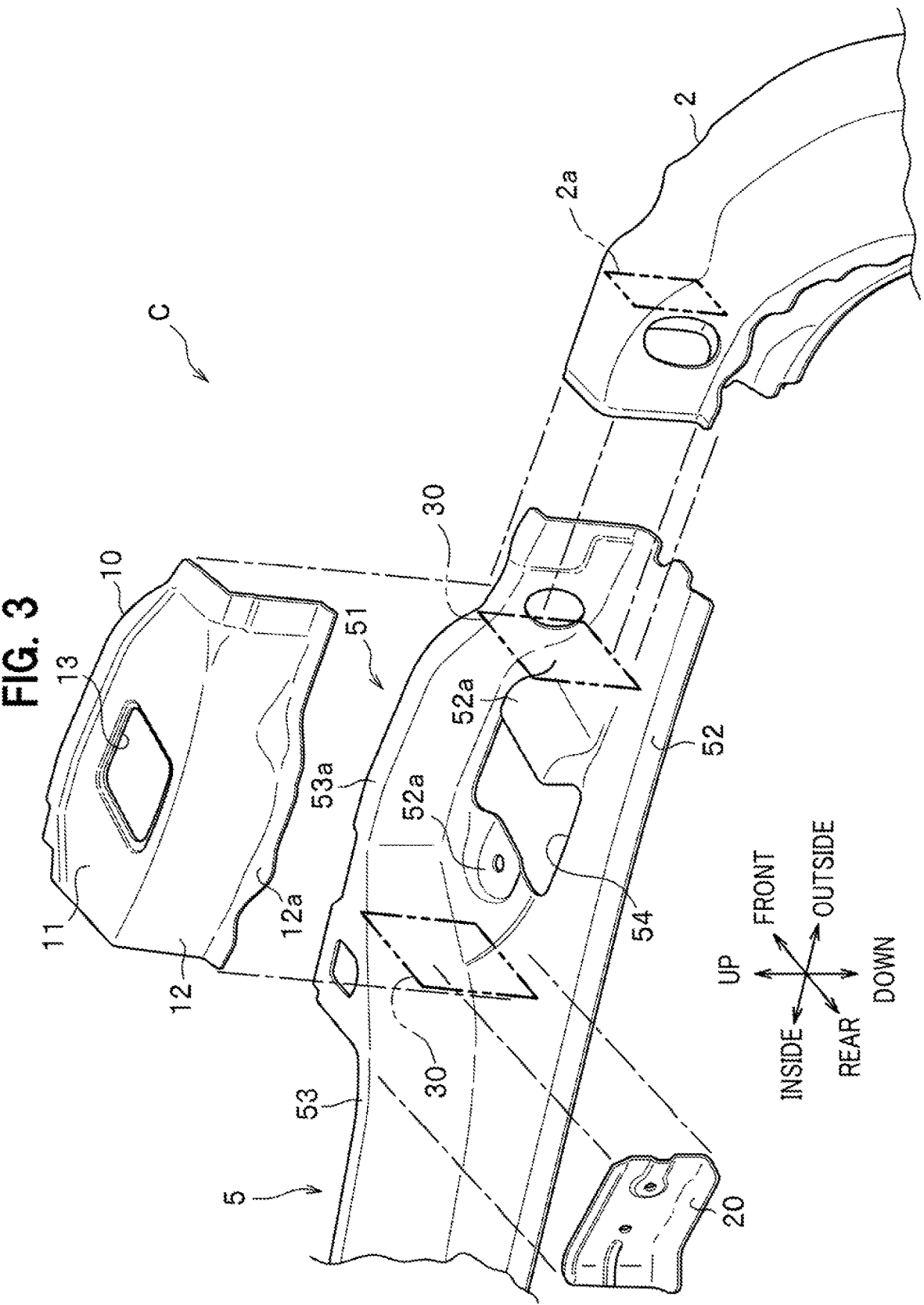

VEHICLE BODY REAR STRUCTURE

CROSS-REFERENCE TO RELATED APPLICATION

The present application claims the benefit of priority to Japanese Patent Application No. 2019-065057 filed on Mar. 28, 2019, the disclosures of all of which are hereby incorporated by reference in their entireties.

TECHNICAL FIELD

Field of the Invention

The present invention relates to a vehicle body rear structure.

BACKGROUND OF THE INVENTION

Conventionally, there is a vehicle body rear structure having a retractor for a seat belt attached to an end portion in the vehicle width direction of a rear roof rail via a bracket (see Japanese Patent No. 4534110, for example). Specifically, the bracket of the vehicle body rear structure extends frontward from an attachment point provided on the rear roof rail, and the retractor is supported at a front extension end of the bracket. In other words, in the conventional vehicle body rear structure, the retractor is separated from the attachment point of the bracket by a length of the bracket.

SUMMARY OF THE INVENTION

However, in the conventional vehicle body rear structure (see Japanese Patent No. 4534110, for example), when the seat belt is pulled down and a load is applied to the retractor, the attachment point is required to have much rigidity and strength for the moment by an outer product of the bracket length and the load. Then, it is conceivable to directly attach the retractor to the rear roof rail without any bracket.

However, if the retractor is directly attached to the rear roof rail, the rear roof rail may not have rigidity and strength sufficiently secured.

An aspect of the present invention is to provide a vehicle body rear structure which sufficiently secures rigidity and strength of a rear roof rail to which a retractor is attached, as compared with a conventional structure.

The present invention to solve the problem above provides a vehicle body rear structure including: a rear roof rail extending in a vehicle width direction and being attached with a retractor for a seat belt; a bracket which is connected to the rear roof rail, so that the retractor is arranged between the bracket and the rear roof rail, and defines an opening portion at an end portion in the vehicle width direction thereof with the rear roof rail; and an extension which connects an end portion in the vehicle width direction of at least one of a top surface and a rear surface of the bracket to a front wall of the rear roof rail. The rear roof rail includes a protruding portion which protrudes frontward to have the retractor arranged therein, and the front wall extending in a vertical direction at a front side of a vehicle body.

The vehicle body rear structure of the present invention sufficiently secures the rigidity and strength of the rear roof rail to which the retractor is attached, as compared with a conventional structure.

BRIEF DESCRIPTION OF THE DRAWINGS

FIG. 3 is an exploded perspective view of the vehicle body rear structure in FIG. 2;

DESCRIPTION OF THE EMBODIMENTS

Figure 1:
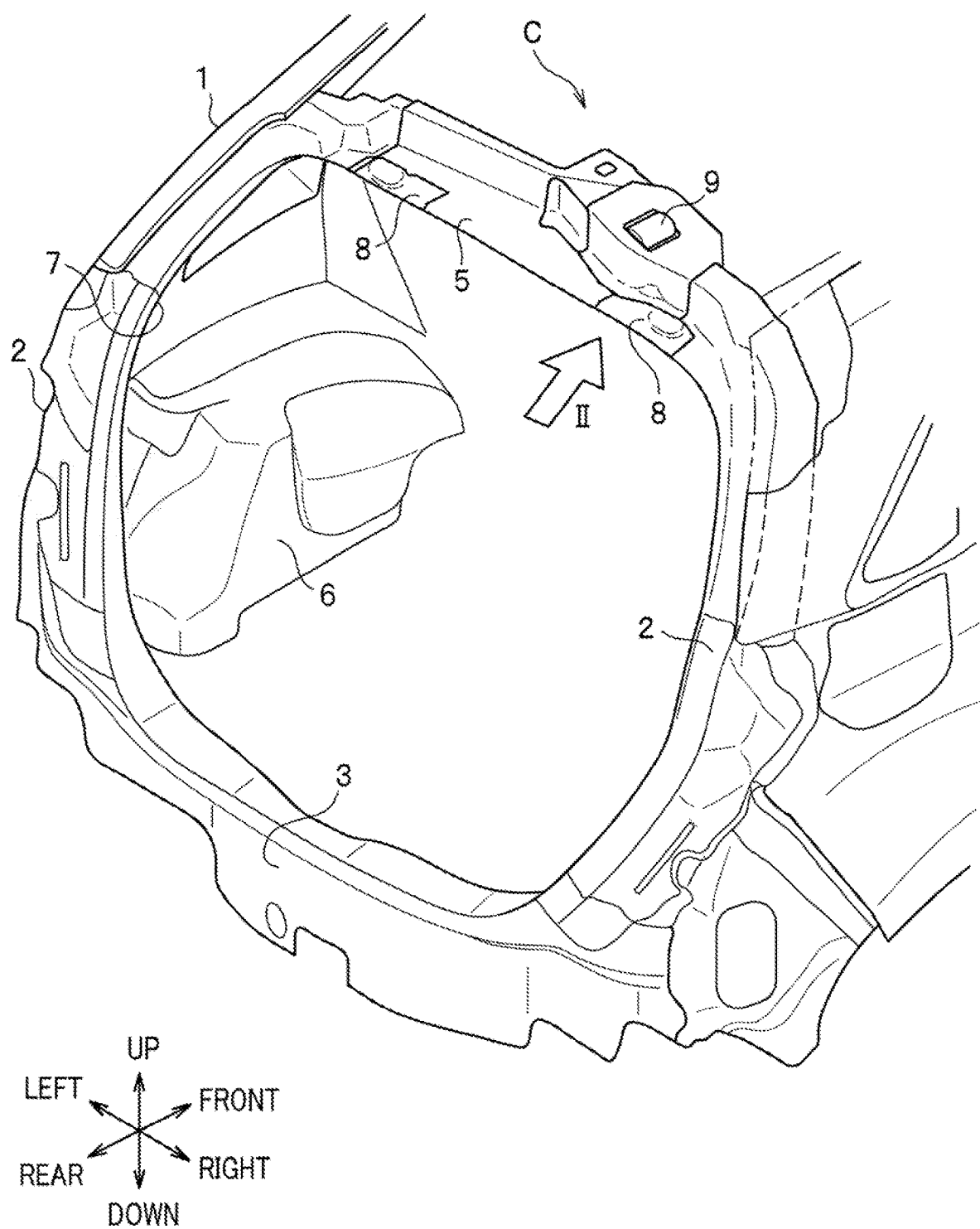
FIG. 1 is a rear perspective view of a vehicle body having a vehicle body rear structure according to an embodiment of the present invention.

Next, a vehicle body rear structure according to an embodiment (the present embodiment) for implementing the present invention will be described in detail with reference to the drawings as appropriate. Directions of up, down, front, rear, right, and left indicated by arrows in the drawings to be referred to correspond to directions of up, down, front, rear, right, and left of a vehicle body. Further, directions of inside and outside indicated by arrows in the drawings correspond to inside in a vehicle width direction and outside in the vehicle width direction.

The vehicle body rear structure according to the present embodiment includes a bracket to be connected to a rear roof rail so that a retractor is arranged between the bracket and a protruding portion, which protrudes frontward, of the rear roof rail. The bracket has opening portions, which are defined by the bracket and the rear roof rail, at ends in the vehicle width direction thereof.

The vehicle body rear structure according to the present embodiment mainly has a feature to include an extension which connects the end portion of the bracket as described above in the vehicle width direction to the rear roof rail.

Hereinafter, the vehicle body having the vehicle body rear structure will be described, and then the vehicle body rear structure will be described.

<Vehicle Body>

FIG. 1 is a rear perspective view of a vehicle body 1 having a vehicle body rear structure C according to an embodiment of the present invention.

As illustrated in FIG. 1, the vehicle body 1 having the vehicle body rear structure C includes rear pillars 2 on both right and left sides of a rear opening 7 to be closed with a rear gate (not shown).

The lower end portions of the rear pillars 2 are connected to both end portions of a rear panel 3 defining the lower side of the rear opening 7.

Further, the lower end portions of the rear pillars 2 are connected to rear wheel houses 6 (illustrated only that on the left side in FIG. 1) arranged on both the right and left sides via rear end panels (not shown).

The respective upper end portions of the rear pillars 2 are connected to both end portions of a rear roof rail 5 defining the upper side of the rear opening 7.

Each rear pillar 2 described above is formed of a plurality of plates, extending in the vertical direction, joined together.

The rear pillar 2 in the present embodiment defines a substantially rectangular closed cross-section with an outer panel, a pillar outer, and a pillar inner (not shown).

In FIG. 1, a reference numeral 8 denotes a reinforcing member of a hinge attachment portion 4 (see FIG. 2), to be described below, for the rear gate. A reference numeral 9 denotes a retractor attached to the rear roof rail 5.

<Vehicle Body Rear Structure>

Next, a description is given of the vehicle body rear structure C (see FIG. 1) of the present embodiment.

Figure 2:
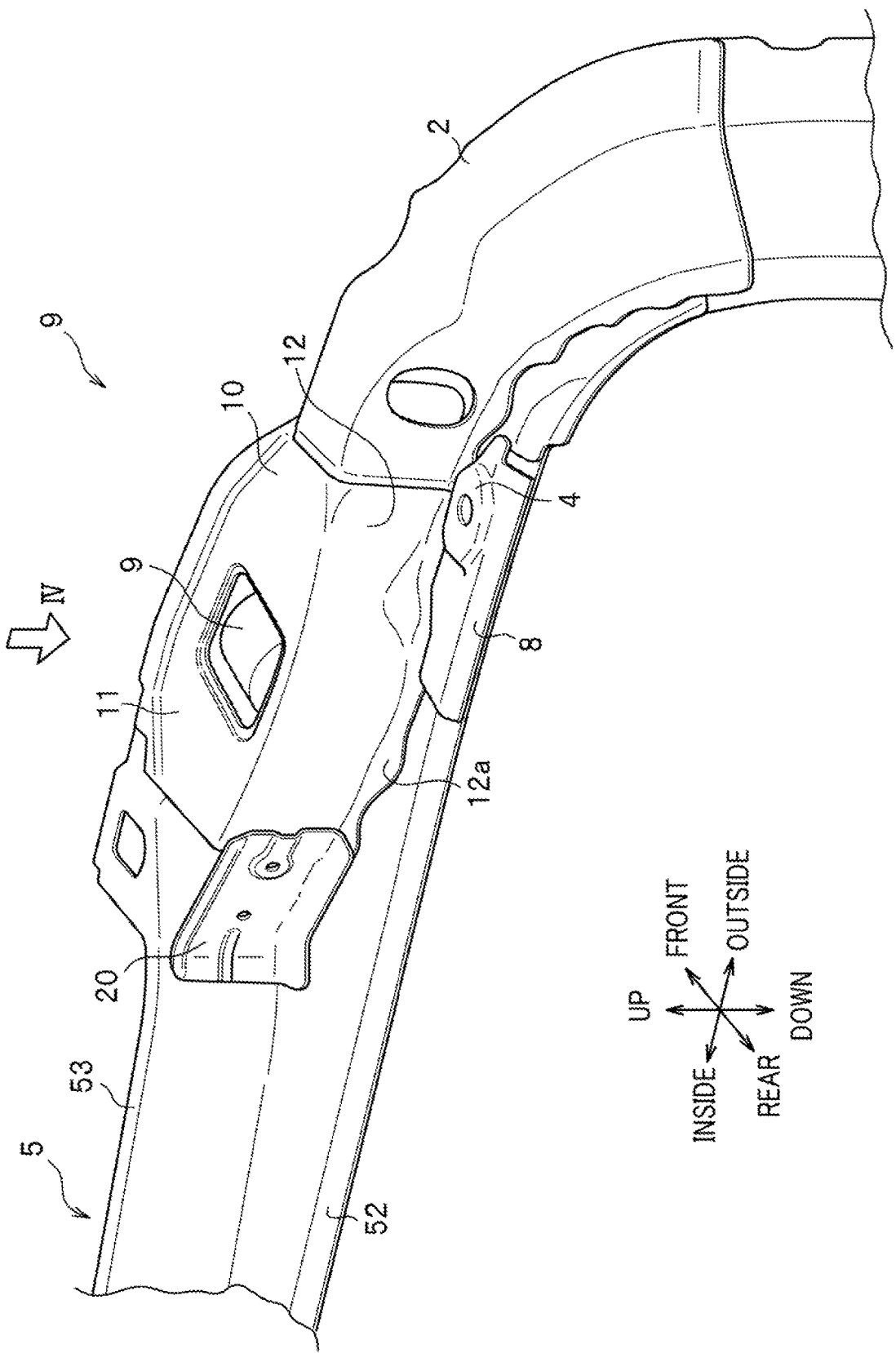
FIG. 2 is an enlarged perspective view of a portion indicated by an arrow II in FIG. 1.

FIG. 2 is an enlarged perspective view of the vehicle body rear structure C of a portion indicated by an arrow II in FIG. 1. FIG. 3 is an exploded perspective view of the vehicle body rear structure C in FIG. 2. In FIG. 3, the retractor 9 (see FIG. 1) and the reinforcing member 8 (see FIG. 1) are not illustrated.

As illustrated in FIG. 2, the vehicle body rear structure C includes the rear roof rail 5 to which the retractor 9 is attached, a bracket 10, an extension 20, the rear pillar 2, and the reinforcing member 8 of the hinge attachment portion 4.

(Rear Roof Rail)

As described above, the rear roof rail 5 illustrated in FIG. 2 defines the upper side of the rear opening (see FIG. 1), and the end portion in the vehicle width direction thereof is connected to the upper end portion of the rear pillar 2 (see FIG. 1).

As illustrated in FIG. 1, the retractor 9 to be described below is attached to the right end portion of the rear roof rail 5.

Although not shown, a webbing belt, with which an occupant is restrained, is drawably wound up by the retractor 9. The webbing belt extending from the retractor 9 into a vehicle interior via a lower opening 54 (see FIG. 3), to be described below, of the rear roof rail 5 has a tongue plate inserted therethrough, where the tongue plate is connectable to a buckle provided on a side of a seat. The distal end of the webbing belt is then fastened to an anchor which is fixed to a side sill. The retractor 9 as described above is configured to restrict the webbing belt by a predetermined lock mechanism from being pulled out when the vehicle body 1 (see FIG. 1) receives a collision load.

As shown in FIG. 3, the rear roof rail 5 has an L-shape in cross-sectional view crossing the vehicle width direction.

Specifically, the rear roof rail 5 includes a bottom wall 52 whose plate surfaces face in the vertical direction and a front wall 53 extending upward from the front edge of the bottom wall 52. The upper edge of the front wall 53 includes a flange 53a which is formed of the upper end of the front wall 53 being bent frontward at a protruding portion 51, to be described below, of the rear roof rail 5.

The bracket 10 to be described below is connected to the flange 53a by welding or the like.

The lower opening 54 is formed in the bottom wall 52 through which the webbing belt (not shown) extending from the retractor 9 (see FIG. 2) is inserted. The bracket 10 to be described below has an upper opening 13 so as to face the lower opening 54.

Further, the bottom wall 52 includes mounts 52a which are formed on both sides in the vehicle width direction of the lower opening 54, for attaching the retractor 9 (see FIG. 2) to the bottom wall 52.

The retractor 9 is attached to the protruding portion 51 of the rear roof rail 5 via the mounts 52a described above.

Figure 4A:
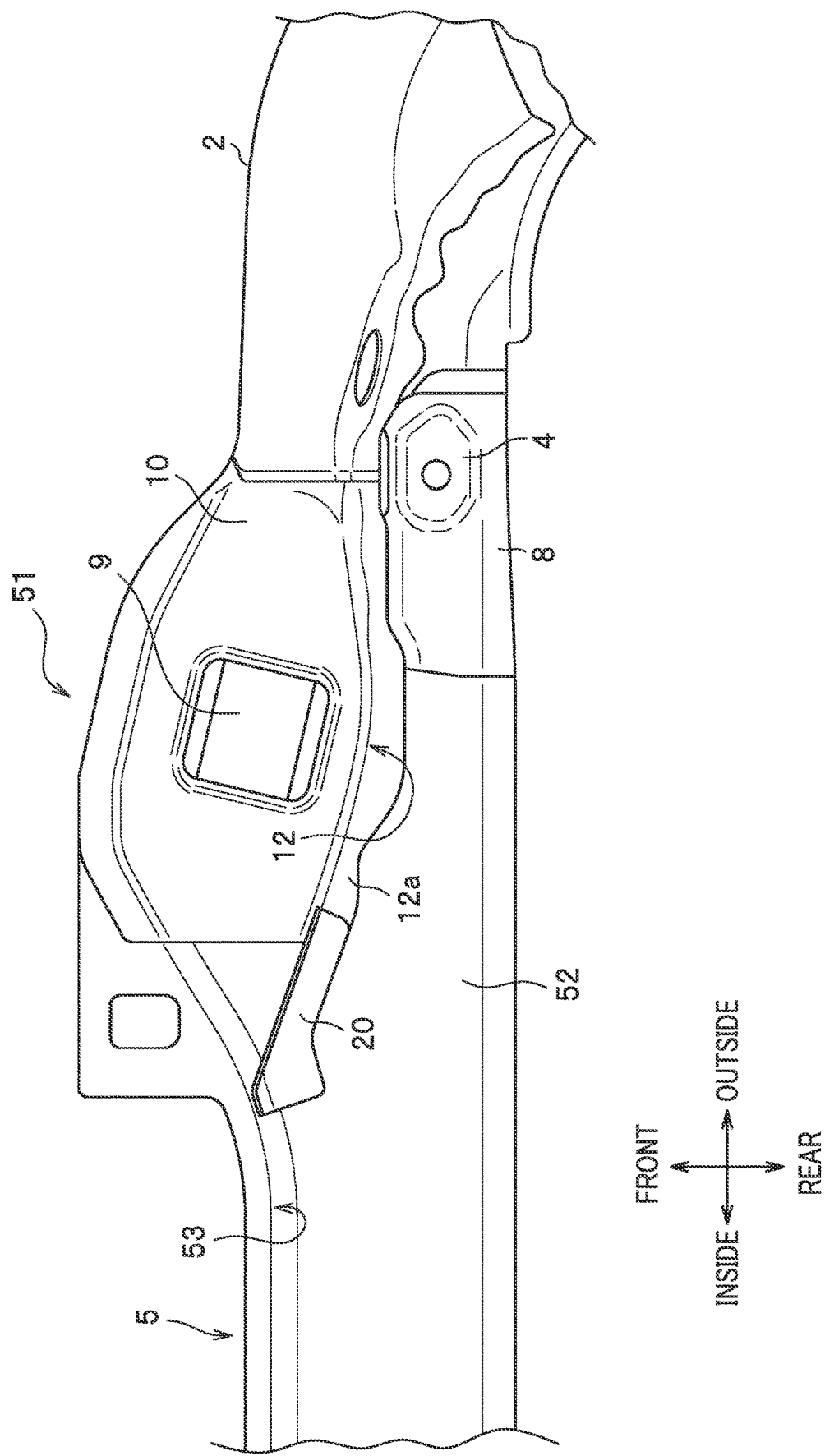
FIG. 4A is a partial planar view of the vehicle body rear structure as viewed from a direction indicated by an arrow IV in FIG. 2.

FIG. 4A to be referred to next is a partial planar view of the vehicle body rear structure C as viewed from a direction indicated by an arrow IV in FIG. 2.

As illustrated in FIG. 4A, the protruding portion 51 of the rear roof rail 5 is formed so that an end portion, closer to the rear pillar 2, of the rear roof rail 5 extending in the vehicle width direction partially protrudes frontward.

Specifically, the front edge of the bottom wall 52 partially bulges frontward.

The retractor 9 is attached to the bottom wall 52 at the protruding portion 51 as described above.

(Bracket)

As illustrated in FIG. 4A, the retractor 9 is arranged between the bracket 10 and the protruding portion 51 of the rear roof rail 5.

As illustrated in FIG. 3, the bracket 10 in the present embodiment has an L-shape in cross-sectional view crossing the vehicle width direction.

Specifically, the bracket 10 includes a top wall 11 which is arranged to face the bottom wall 52 forming the protruding portion 51 of the rear roof rail 5. Further, the bracket 10 includes a rear wall 12 which extends downward from the rear edge of the top wall 11 and is arranged to face the front wall 53 forming the protruding portion 51. The top wall 11 of the bracket 10 corresponds to a "top surface of the bracket" in the appended claims and the rear wall 12 of the bracket 10 corresponds to a "rear surface of the bracket" in the appended claims.

The rear wall 12 includes, at the lower edge thereof, a flange 12a which is formed of the lower end of the rear wall 12 bent rearward.

The flange 12a is connected to the bottom wall 52 of the rear roof rail 5 by welding or the like.

The bracket 10 as described above, with the flange 12a of the bracket 10 connected to the bottom wall 52 and the flange 53a of the rear roof rail 5 connected to the top wall 11, accommodates the retractor 9 (see FIG. 2) between the bracket 10 and the rear roof rail 5. That is, the bracket 10 serves as a cover member of the retractor 9.

Further, with the connection between the bracket 10 as described above and the rear roof rail 5, the bracket 10 defines opening portions 30, having a substantially rectangular shape, at both ends in the vehicle width direction thereof, as indicated by imaginary lines (two-dot chain lines) in FIG. 3.

Incidentally, the opening portions 30 in the present embodiment are defined by the bracket 10 arranged to fit on the protruding portion 51.

The rear roof rail 5 is connected to the rear pillar 2 on an outer side in the vehicle width direction of the opening portion 30 closer to the rear pillar 2.

Further, the bracket 10 is connected to the rear pillar 2 on the opposite side in the vehicle width direction with respect to the side on which the extension 20 described below is attached.

With the structure, the rectangular closed cross-section defined by the bracket 10 and the rear roof rail 5 is continuous through the closed cross-section of the upper end portion of the rear pillar 2 to the closed cross-section of the lower end portion of the rear pillar 2 illustrated in FIG. 1. In FIG. 3, reference numeral 2a denotes the closed cross-section at the upper end portion of the rear pillar 2. A reference numeral 20 denotes the extension described below.

(Extension)

Next, the extension 20 (see FIG. 3) will be described.

As illustrated in FIG. 3, the extension 20 is formed of a bent plate.

As illustrated in FIG. 2, the extension 20 connects the end portion, which is located on an inner side in the vehicle width direction, of the rear wall 12 (rear surface) of the bracket 10 to the front wall 53 of the rear roof rail 5.

Specifically, as illustrated in FIG. 4A, the extension 20 is arranged along an extending direction of the rear wall 12 of the bracket 10 to connect the rear roof rail 5 to the bracket 10.

The extension 20 is not limited to the structure as described above to connect the end portion, which is located on the inner side in the vehicle width direction, of the rear wall 12 (rear surface) to the front wall 53 of the rear roof rail 5.

That is, the extension 20 may also be configured to connect an end portion, which is located on the outer side in the vehicle width direction, of the rear wall 12 (rear surface) to the front wall 53 of the rear roof rail 5. Further, a pair of extensions 20 may be provided to connect both the end portions on the inner side and the outer side in the vehicle width direction to the front wall 53 of the rear roof rail 5.

Further, the extension 20 is not limited to the structure as described above to connect the rear wall 12 (rear surface) of the bracket 10 to the front wall 53 of the rear roof rail 5.

Figure 4B:
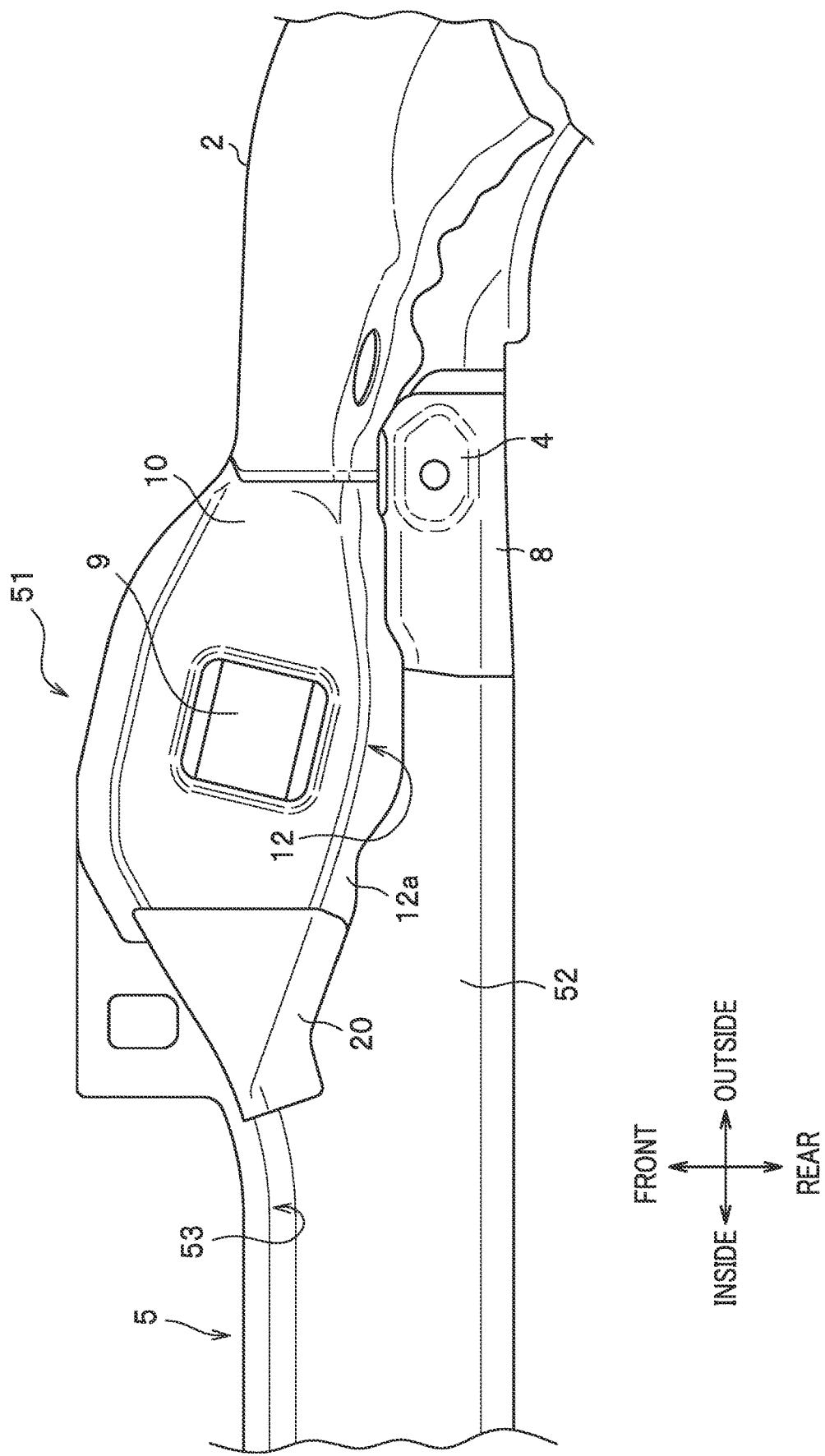
FIG. 4B is partial planar view of an alternative configuration of an extension of the vehicle body rear structure as viewed from the direction indicated by an arrow IV in FIG. 2.

That is, the extension 20 in the present embodiment is configured to connect at least one of the top wall 11 (top surface, as illustrated in FIG. 4B) and the rear wall 12 (rear surface, as illustrated in FIG. 4A) of the bracket 10 to the front wall 53 of the rear roof rail 5.

Therefore, as illustrated in FIG. 4B, the extension 20 may be arranged to connect the top wall 11 (top surface) of the bracket 10 to the upper edge of the front wall 53 of the rear roof rail 5. Still further, as illustrated in FIG. 4B, the extension 20 may also connect both the top wall 11 (top surface) and rear wall 12 (rear surface) of the bracket 10 to the front wall 53 of the rear roof rail 5.

Figure 5:
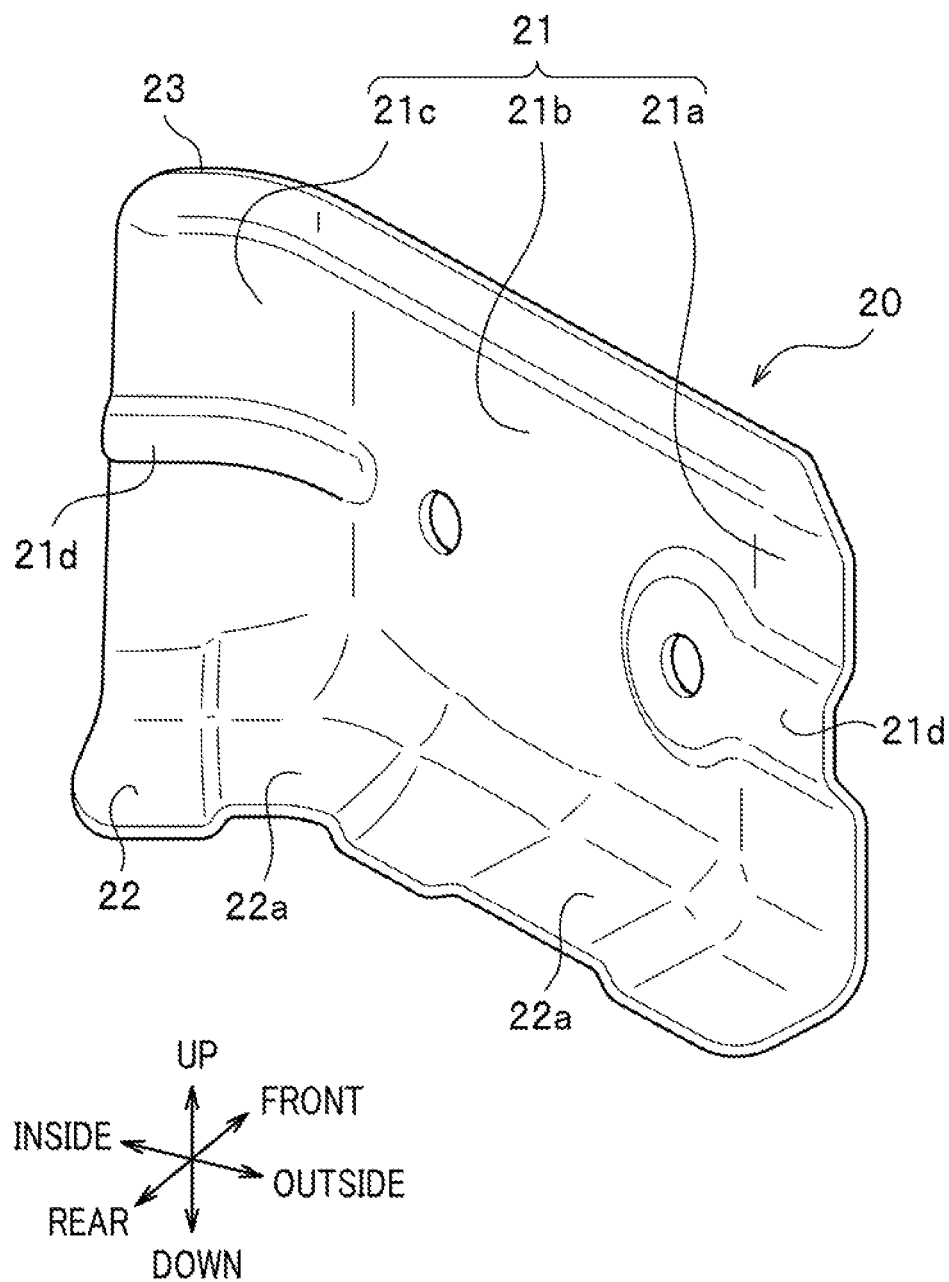
FIG. 5 is an entire perspective view of the extension forming the vehicle body rear structure.

FIG. 5 is an entire perspective view of the extension 20.

As illustrated in FIG. 5, the extension 20 includes a vertical wall 21 extending in the vertical direction, a bottom surface 22 arranged to extend in the longitudinal direction from the lower end of the vertical wall 21 so as to follow the bottom wall 52 (see FIG. 2) of the rear roof rail 5 (see FIG. 2), and a reinforcing flange 23 extending along the upper edge of the vertical wall 21.

The vertical wall 21 includes a bracket attachment portion 21*a*, a vertical wall main portion 21*b*, and a rear roof rail attachment portion 21*c* in order from the outermost in the vehicle width direction.

The bracket attachment portion 21*a* is overlapped, and connected by spot welding or the like, with the rear wall 12 (see FIG. 2) of the bracket 10 (see FIG. 2).

The bottom surface 22 located below the bracket attachment portion 21*a* is overlapped with the flange 12*a* (see FIG. 4A) of the bracket 10 (see FIG. 4A) and the bottom wall 52 (see FIG. 4A) of the rear roof rail 5 in three layers for spot welding.

The vertical wall main portion 21*b* is a plate continuous to the bracket attachment portion 21*a* and arranged to follow the rear wall 12 (see FIG. 4A) in the extending direction of the bracket 10 (see FIG. 4A).

The bottom surface 22 located below the vertical wall main portion 21*b* is overlapped with the bottom wall 52 (see FIG. 4A) of the rear roof rail 5 (see FIG. 4A) in two layers for spot welding.

The rear roof rail attachment portion 21*c* is continuous to the vertical wall main portion 21*b* and is formed to be bent from the vertical wall main portion 21*b* so as to follow the front wall 53 (see FIG. 4A) of the rear roof rail 5 (see FIG. 4A). The bottom surface 22 located below the rear roof rail attachment portion 21*c* is overlapped with the bottom wall 52 (see FIG. 4A) of the rear roof rail 5 (see FIG. 4A) in two layers for spot welding.

The vertical wall 21 as described above is formed with beads 21*d* extending in the vehicle width direction.

Specifically, the beads 21*d* are each formed in the bracket attachment portion 21*a* and the rear roof rail attachment portion 21*c*.

Further, the extension 20 has beads 22*a* formed from the bottom surface 22 to the vertical wall 21.

The reinforcing flange 23 is formed of the upper end of the vertical wall 21 which is bent to slightly incline rearward. The reinforcing flange 23 improves rigidity and strength at the upper edge of the vertical wall 21.

(Reinforcing Member)

Next, a description will be given of the reinforcing member 8 (see FIG. 2) of the hinge attachment portion 4 (see FIG. 2).

As illustrated in FIG. 2, the reinforcing member 8 is formed integrally with the hinge attachment portion 4.

Although not shown, a hinge leaf for the vehicle body, which pivotally supports a hinge leaf for the rear gate to be attached to the rear gate, is fastened to the hinge attachment portion 4 with bolts or the like.

As illustrated in FIG. 2, the reinforcing member 8 in the present embodiment is formed of a plate in a substantially flat shape extending in the vehicle width direction. Specifically, as illustrated in FIG. 4A, the reinforcing member 8 has an elongated rectangular shape extending along the rear edge of the bottom wall 52 of the rear roof rail 5 in planar view.

Further, the reinforcing member 8 is arranged to overlap in the longitudinal direction with the bracket 10 and the upper end portion of the rear pillar 2.

The reinforcing member 8 is subjected to spot welding to the bottom wall 52 of the rear roof rail 5 and is also subjected to spot welding to the flange 12*a* on the rear wall 12 of the bracket 10.

<Advantageous Effects>

Next, a description will be given of advantageous effects of the vehicle body rear structure C of the present embodiment.

The vehicle body rear structure C of the present embodiment includes the bracket 10 connected to the rear roof rail 5 so that the retractor 9 is arranged between the bracket 10 and the protruding portion 51 of the rear roof panel 5.

According to the vehicle body rear structure C as described above, a space for arranging the retractor 9 is secured on the front side of the rear roof rail 5.

Further, the vehicle body rear structure C includes the extension 20 connecting at least one of the top wall 11 (top surface) and rear wall 12 (rear surface) of the bracket 10 to the front wall 53 of the rear roof rail 5.

In the vehicle body rear structure C as described above, a load applied from a seat belt (not shown) to the retractor 9 is applied downward to the protruding portion 51. This load is transmitted to the front wall 53 of the rear roof rail 5 via the bracket 10 and the extension 20. Accordingly, the vehicle body rear structure C improves torsional rigidity and strength of the rear roof rail 5 against the load applied from the seat belt.

Further, according to the vehicle body rear structure C as described above, the extension 20 prevents deformation of the opening 30. Thus, the vehicle body rear structure C improves rigidity and strength of the attachment portion of the rear roof rail 5 for the retractor 9.

Further, in the vehicle body rear structure C, the closed cross-section defined by the bracket 10 and the rear roof rail 5 is continuous to the closed cross-section of the rear pillar 2.

According to the vehicle body rear structure C as described above, the load applied from the seat belt (not shown) to the retractor 9 is efficiently transmitted to the rear pillar 2.

Accordingly, the vehicle body rear structure C suppresses an excessive load from being concentrated on the rear roof rail 5 via the seat belt (not shown).

Still further, the closed cross-section defined by the bracket 10 and the rear roof rail 5 is continuous to the closed cross-section of the rear pillar 2 so that the torsional rigidity from the attachment portion of the rear roof rail 5 for the retractor 9 to the upper end of the rear pillar 2 is increased.

Further, in a case where the rear roof rail 5 without the bracket 10 is used, when the retractor 9 is attached to the rear roof rail 5 so as to be close to the rear pillar 2, it is difficult to secure the rigidity and strength of a connecting portion of the rear roof rail 5 to the rear pillar 2.

Meanwhile, in the vehicle body rear structure C, the closed cross-section defined by the bracket 10 and the rear roof rail 5 is connected so as to be continuous to the closed cross-section of the rear pillar 2, allowing the retractor 9 to be arranged close to the rear pillar 2 while increasing the rigidity and strength of the rear roof rail 5.

Further, according to the vehicle body rear structure C, the rigidity and strength of the retractor 9 from the attachment portion to the rear pillar 2 are increased so that no additional reinforcement is required on the rear pillar 2 closer to the retractor 9 (rear pillar 2 on the right side in the present embodiment). Thus, the vehicle body rear structure C contributes to reduction in weight of the vehicle body 1.

Still further, no additional reinforcement being required on the rear pillar 2 allows the right and left rear pillars 2 to have a symmetrical shape. Accordingly, vibration and noise of the vehicle body 1, caused by the right and left rear pillars 2 having an asymmetrical shape, are suppressed.

Further, in the vehicle body rear structure C, the vertical wall 21 of the extension 20 is formed with the beads 21d extending in the vehicle width direction.

According to the vehicle body rear structure C as described above improves the rigidity and strength of the extension 20 in the vehicle width direction. Accordingly, in the vehicle body rear part structure C, the load applied in the vehicle width direction to the rear roof rail 5 is efficiently transmitted between the bracket 10 and the front wall 53 of the rear roof rail 5. Therefore, the vehicle body rear structure C increases the rigidity and strength in the vehicle width direction of the rear roof rail 5.

Further, in the vehicle body rear structure C, the extension 20 includes the bottom surface 22 which extends in the longitudinal direction from the lower end of the vertical wall 21. Still further, the bottom surface 22 is joined to the rear roof rail 5.

According to the vehicle body rear structure C as described above, the rigidity and strength in the vehicle width direction of the extension 20 is increased. Accordingly, the vehicle body rear structure C increases the rigidity and strength of the attachment portion of the rear roof rail 5 for the retractor 9. Thus, the vehicle body rear structure C increases the rigidity and strength in the vehicle width direction of the rear roof rail 5.

Still further, according to the vehicle body rear structure C as described above, the torsional rigidity and strength about an axis in the vehicle width direction of the extension 20 are also increased. Accordingly, the vehicle body rear structure C increases the torsional rigidity and strength of the rear roof rail 5 to the load applied from the seat belt.

Further, in the vehicle body rear structure C, the reinforcing member 8 of the hinge attachment portion 4 of the rear gate (not shown), the rear roof rail 5, and the bracket 10 are joined to each other.

According to the vehicle body rear structure C as described above, the rigidity and strength of both the attachment portion of the rear roof rail 5 for the retractor 9 and the hinge attachment portion 4 are increased.

The present embodiment has been described above, but the present invention is not limited to the embodiment described above and can be implemented in various forms.

In the above embodiment, the vehicle body rear structure C is assumed to have the retractor 9 provided only on the right end portion of the rear roof rail 5, but the present invention is not limited thereto. In other words, the vehicle body rear part structure C may have the retractor 9 only on the left end portion of the rear roof rail 5 or have the retractors 9 on both right and left end portions of the rear roof rail 5.

Incidentally, the vehicle body rear structure C including the retractor 9 on the left end portion of the rear roof rail 5 has a symmetrical structure of the vehicle body rear structure C (right side structure) in the embodiment with respect to the center axis of the vehicle.

What is claimed is:

1. A vehicle body rear structure comprising:
   a rear roof rail extending in a vehicle width direction and being attached with a retractor for a seat belt;
   a bracket which is connected to the rear roof rail, so that the retractor is arranged between the bracket and the rear roof rail, and defines an opening portion at an end portion in the vehicle width direction thereof with the rear roof rail; and
   an extension which connects an end portion in the vehicle width direction of at least one of a top surface and a rear surface of the bracket to a front wall of the rear roof rail,
   wherein the rear roof rail includes a protruding portion which protrudes frontward to have the retractor arranged therein, and the front wall extending in a vertical direction at a front side of a vehicle body.

2. The vehicle body rear structure as claimed in claim 1 further comprising:
   a rear pillar extending in the vertical direction to define a closed cross-section at a rear portion of the vehicle body,
   wherein a closed cross-section defined by the bracket and the rear roof rail is continuous to the closed cross-section of the rear pillar on an opposite side to a side where the extension is attached, with respect to the vehicle width direction of the rear roof rail.

3. The vehicle body rear structure as claimed in claim 1, wherein the extension includes a vertical wall extending in the vertical direction and a bead extending in the vehicle width direction in the vertical wall.

4. The vehicle body rear structure as claimed in claim 3, wherein the extension includes a bottom surface extending in a longitudinal direction from a lower end of the vertical wall, and the bottom surface is joined to the rear roof rail.

5. The vehicle body rear structure as claimed in claim 1 further comprising a reinforcing member of a hinge attachment portion for a rear gate, wherein the rear roof rail, the bracket, and the reinforcing member are joined to each other.

* * * * *